United States Patent
Ravi et al.

(10) Patent No.: US 10,762,453 B2
(45) Date of Patent: Sep. 1, 2020

(54) METHODS AND SYSTEMS FOR MONITORING A CHARGING PATTERN TO IDENTIFY A CUSTOMER

(71) Applicant: Honda Motor Co., Ltd., Tokyo (JP)

(72) Inventors: Narendran Ravi, Torrance, CA (US); Steven Rho, Atlanta, GA (US); Mohitash Brijwasi, La Palma, CA (US); Maira Malik, Long Beach, CA (US); Aparajithan Rajendran, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 316 days.

(21) Appl. No.: 15/706,168

(22) Filed: Sep. 15, 2017

(65) Prior Publication Data

US 2019/0087759 A1    Mar. 21, 2019

(51) Int. Cl.
| | |
|---|---|
| *G06Q 10/06* | (2012.01) |
| *B60L 53/65* | (2019.01) |
| *B60L 53/66* | (2019.01) |
| *G06Q 50/06* | (2012.01) |
| *G06Q 50/30* | (2012.01) |

(52) U.S. Cl.
CPC .......... *G06Q 10/0631* (2013.01); *B60L 53/65* (2019.02); *B60L 53/665* (2019.02); *B60L 2240/72* (2013.01); *G06Q 50/06* (2013.01); *G06Q 50/30* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | |
|---|---|---|---|
| 8,531,162 B2 * | 9/2013 | Hafner | B60L 53/665 320/137 |
| 8,615,355 B2 | 12/2013 | Inbarajan et al. | |
| 8,725,551 B2 | 5/2014 | Ambrosio et al. | |
| 8,731,974 B2 | 5/2014 | Pandhi et al. | |

(Continued)

FOREIGN PATENT DOCUMENTS

| | | |
|---|---|---|
| GB | 2542848 A | 5/2017 |
| WO | WO 2013/106345 A1 | 7/2013 |

OTHER PUBLICATIONS

Kelly, J., et. al. "Time-dependent plug-in hybrid electric vehicle charging based on national driving patterns and demographics," Applied Energy, 94, pp. 395-405, 2012.

*Primary Examiner* — Alan S Miller
(74) *Attorney, Agent, or Firm* — Arent Fox, LLP

(57) ABSTRACT

Systems and methods for monitoring a charging pattern to identify a customer. The system includes a memory that stores instructions for executing processes for monitoring a charging pattern to identify a customer. The system also includes a processor configured to execute the instructions. The instructions cause the processor to: monitor charging patterns of each user of a plurality of users of a shared vehicle to determine a preferred charging mode for each user; generate a user profile for each user of the plurality of users, the user profile indicating preferences for each respective user; identify a user operating the vehicle; transmit, to a third party vendor, a request for a resource based on the user profile of the user operating the vehicle; and transmit a charging schedule to the vehicle after receiving a response to the request for the resource.

17 Claims, 4 Drawing Sheets

(56) References Cited

U.S. PATENT DOCUMENTS

| | | | |
|---|---|---|---|
| 9,104,537 B1* | 8/2015 | Penilla | G06F 17/00 |
| 9,123,035 B2* | 9/2015 | Penilla | G06Q 20/18 |
| 9,158,962 B1* | 10/2015 | Nemat-Nasser | G06K 9/00845 |
| 9,171,268 B1* | 10/2015 | Penilla | G06Q 10/02 |
| 9,180,783 B1* | 11/2015 | Penilla | H02J 7/0045 |
| 9,229,905 B1* | 1/2016 | Penilla | G06F 17/00 |
| 9,230,440 B1* | 1/2016 | Penilla | G08G 1/145 |
| 9,288,270 B1* | 3/2016 | Penilla | H04L 67/306 |
| 9,346,365 B1* | 5/2016 | Penilla | H02J 7/0027 |
| 9,371,007 B1* | 6/2016 | Penilla | B60L 11/1848 |
| 9,467,515 B1* | 10/2016 | Penilla | H01M 2/206 |
| 9,505,318 B2* | 11/2016 | Hendrix | B60L 11/1838 |
| 9,545,853 B1* | 1/2017 | Penilla | B60L 53/30 |
| 9,815,382 B2* | 11/2017 | Penilla | B60L 11/1848 |
| 10,210,487 B2* | 2/2019 | Penilla | G06Q 10/1095 |
| 10,223,134 B1* | 3/2019 | Penilla | G09G 5/14 |
| 2009/0313098 A1* | 12/2009 | Hafner | B60L 53/64 705/14.1 |
| 2009/0313103 A1* | 12/2009 | Ambrosio | B60L 8/00 705/14.25 |
| 2010/0228405 A1* | 9/2010 | Morgal | B62H 3/02 701/2 |
| 2011/0224868 A1 | 9/2011 | Collings, III et al. | |
| 2011/0246252 A1* | 10/2011 | Uesugi | B60L 3/12 705/7.12 |
| 2012/0330494 A1* | 12/2012 | Hendrix | B60L 11/1838 701/29.3 |
| 2013/0103378 A1* | 4/2013 | Tinnakornsrisuphap | B60L 58/13 703/18 |
| 2013/0110296 A1* | 5/2013 | Khoo | B60L 58/12 700/286 |
| 2013/0179061 A1* | 7/2013 | Gadh | H02J 3/14 701/123 |
| 2013/0226371 A1* | 8/2013 | Rovik | H04L 63/102 701/2 |
| 2013/0335005 A1 | 12/2013 | Ohama | |
| 2015/0249718 A1* | 9/2015 | Huybregts | G06K 9/00228 709/202 |
| 2015/0379331 A1* | 12/2015 | Nemat-Nasser | G06K 9/00845 382/118 |
| 2016/0031338 A1* | 2/2016 | Penilla | B60L 50/52 320/109 |
| 2016/0080500 A1* | 3/2016 | Penilla | H04L 67/306 709/226 |
| 2016/0126732 A1* | 5/2016 | Uyeki | B60L 53/63 700/295 |
| 2016/0297316 A1* | 10/2016 | Penilla | B60L 11/1848 |
| 2017/0101025 A1* | 4/2017 | Penilla | B60L 53/80 |
| 2017/0103327 A1* | 4/2017 | Penilla | B60L 58/12 |
| 2017/0176195 A1* | 6/2017 | Rajagopalan | G01C 21/3415 |
| 2018/0007099 A1* | 1/2018 | Ein-Gil | H04L 63/08 |
| 2018/0089912 A1* | 3/2018 | Penilla | G06Q 10/1095 |
| 2018/0111494 A1* | 4/2018 | Penilla | H02J 7/0027 |

* cited by examiner

ID A CUSTOMER

TECHNICAL FIELD

The present disclosure relates to methods and systems for monitoring a charging pattern to identify a customer.

BACKGROUND

An electric vehicle uses one or more electric motors for propulsion of the vehicle. The electric motors may be powered by rechargeable batteries on-board the vehicle. A driver of an electric vehicle typically recharges the batteries of the vehicle according to different charging modes that transfer electric energy to the vehicle. A utility company supplies the electric energy to the charging station and charges the driver for the electric energy based on the time, day, month, and/or calendar season when the electric energy is provided. Typically, a utility company charges are based on off-peak hours versus peak hours, with peak hours being more expensive than off-peak hours. If an electric vehicle is being charged by a single user, manufacturing servers and utility providers may set certain charging parameters based on the charging patterns of the user. However, in some instances, a vehicle may be shared by multiple users, such as family members and/or roommates. In such instances, it is difficult for manufacturing servers and utility providers to distinguish between the charging patterns of the respective users.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the present disclosure is related to a system that includes a memory that stores instructions for executing processes for monitoring a charging pattern to identify a customer. The system also includes a processor configured to execute the instructions that cause the processor to monitor charging patterns of each user of a plurality of users of a shared vehicle to determine a preferred charging mode for each user. The instructions also cause the processor to generate a user profile for each user of the plurality of users, the user profile indicating preferences for each respective user and to identify a user operating the vehicle. The instructions further cause the processor to transmit, to a third party vendor, a request for a resource based on the user profile of the user operating the vehicle. The instructions also cause the processor to transmit a charging schedule to the vehicle after receiving a response to the request for the resource.

In a further aspect, the present disclosure is related to a method that includes monitoring charging patterns of each user of a plurality of users of a shared vehicle to determine a preferred charging mode for each user. The method also includes generating a user profile for each user of the plurality of users, the user profile indicating preferences for each respective user and identifying a user operating the vehicle. The method further includes transmitting, to a third party vendor, a request for a resource based on the user profile of the user operating the vehicle. The method also includes transmitting a charging schedule to the vehicle after receiving a response to the request for the resource.

In a further aspect, the present disclosure relates to a non-transitory computer-readable storage medium containing executable computer program code. The code includes instructions configured to cause a processor to monitor charging patterns of each user of a plurality of users of a shared vehicle to determine a preferred charging mode for each user. The code includes instructions configured to cause a processor to generate a user profile for each user of the plurality of users, the user profile indicating preferences for each respective user and to identify a user operating the vehicle. The code further includes instructions configured to cause a processor to transmit, to a third party vendor, a request for a resource based on the user profile of the user operating the vehicle. The code includes instructions configured to cause a processor to transmit a charging schedule to the vehicle after receiving a response to the request for the resource.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Figure 1:
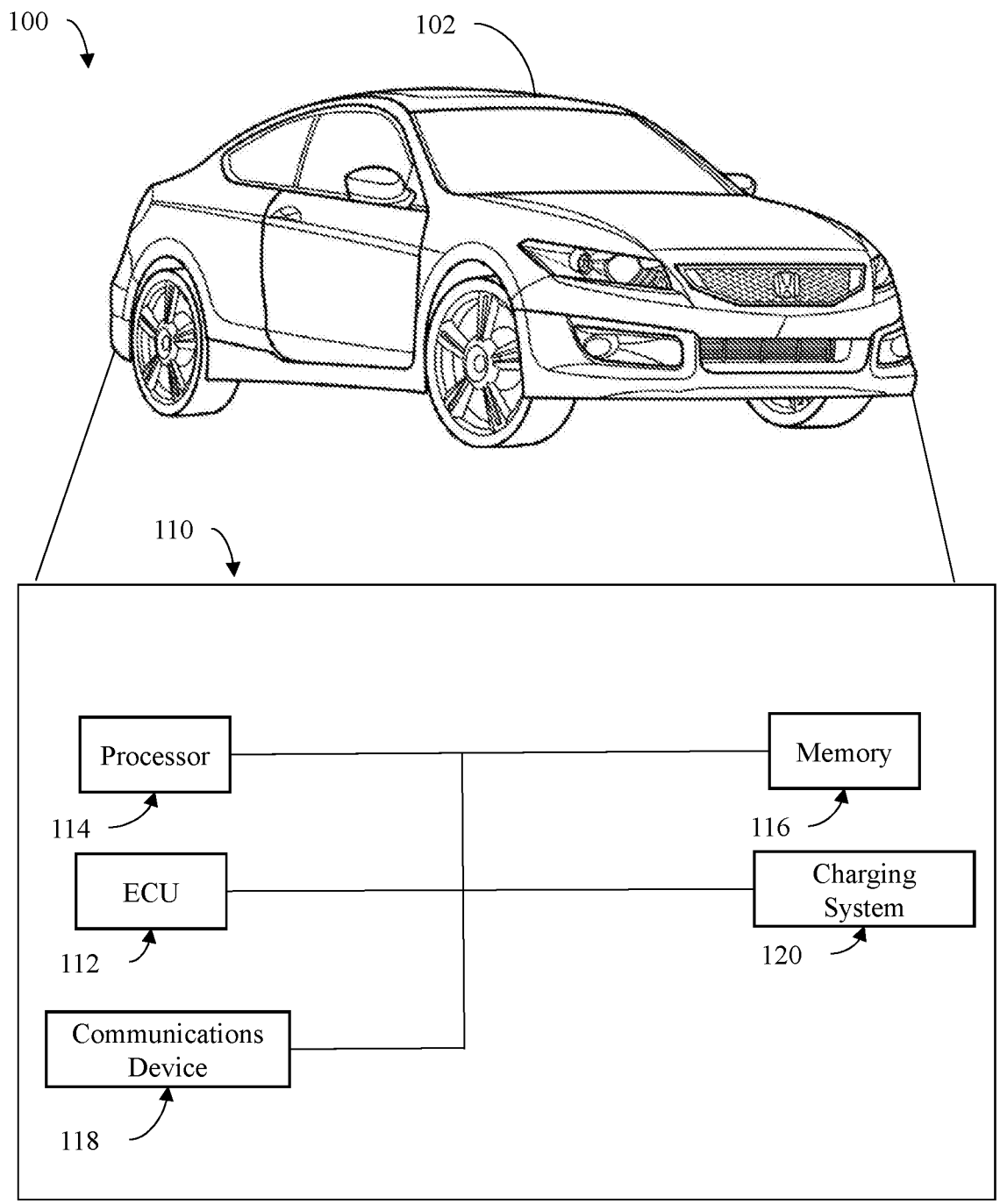
FIG. 1 illustrates a schematic view of an exemplary operating environment of a vehicle system in accordance with aspects of the present disclosure.

Generally described, the present disclosure provides systems and methods for monitoring a charging pattern to identify a customer. Turning to FIG. 1, a schematic view of an exemplary operating environment 100 of a vehicle system 110 according to an aspect of the disclosure is provided. The vehicle system 110 may reside within a vehicle 102. The components of the vehicle system 110, as well as the components of other systems, hardware architectures, and software architectures discussed herein, may be combined, omitted or organized into various implementations.

In some aspects, the vehicle 102 may be an electric vehicle that contains an electric motor (not shown) for propelling the vehicle 102. In other aspects, the vehicle 102 may be for example, a plug-in hybrid electric vehicle, that includes an electric motor and an internal combustion engine (not shown) for propelling the vehicle 102.

The vehicle 102 may include an electronic control unit (ECU) 112 that operably controls a plurality of vehicle systems. The ECU 112 may include internal processing memory, an interface circuit, and bus lines for transferring data, sending commands, and communicating with the vehicle systems. The ECU 112 may include an internal processor and memory (not shown). The vehicle 102 may also include a bus for sending data internally among the various components of the vehicle system 110. The vehicle systems may include, but are not limited to, the vehicle system 110, among others, including vehicle HVAC systems, vehicle audio systems, vehicle video systems, vehicle infotainment systems, vehicle telephone systems, and the like. The vehicle system 110 may also include a processor 114 and a memory 116 that communicate with the ECU 112.

The vehicle 102 may include a communications device 118 (e.g., wireless modem) for providing wired or wireless computer communications utilizing various protocols to send/receive electronic signals with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 118 of the vehicle 102 may be operably connected for internal computer communication via a bus (e.g., a CAN or a LIN protocol bus) to facilitate data input and output between the electronic control unit 112 and vehicle features and systems. In some aspects, the communications device 118 may be configured for vehicle-to-vehicle (V2V) communications, vehicle-to-pedestrian (V2P) communications, and/or vehicle-to-anything (V2X) communications. For example, V2V, V2P, and V2X communications may include wireless communications over a reserved frequency spectrum. As another example, V2V, V2P, and V2X communications may include an ad hoc network between vehicles set up using Wi-Fi or Bluetooth®. In further aspects, the communications device 118 may be configured for remote communications with a manufacturer server.

The vehicle 102 may include a charging system 120. For example, the charging system 120 may include the electric motor of the vehicle 102, which may be powered by rechargeable batteries (not shown) on-board the vehicle 102. The on-board batteries may be charged when the vehicle 102 is connected to a charging station. In some aspects, the charging system 120 may be connected to a charging station via a charging cable. In other aspects, the charging system 120 may be connected to the charging station wirelessly. The charging station may be a device that provides electric energy to the vehicle 102. The electric energy may be supplied to the charging station by a third party, such as a utility company, through an electrical grid. In some aspects, the charging station may be located at a driver's home or office. In some aspects, the charging station may be located at a public location, such as a retail shopping center or a rest stop.

The charging system 120 may include a display and a control unit. In some aspects, the display illustrates information exchanged between entities connected to a communication network, see, e.g., FIG. 2. The display may also receive instructions from the user regarding a charging mode for charging the vehicle 102 when the vehicle 102 is connected to the charging station. In some aspects, the vehicle 102 may be charged based on a charging mode selected by a user. For example, the charging mode may be one of a regular charging mode, an economic charging mode, a green charging mode, a fast charging mode, or a slow charging mode. These charging modes are only examples of charging modes available to the user, and it should be understood that other charging modes are also contemplated according to aspects of the present disclosure.

In some aspects, in the regular charging mode, the control unit may initiate charging the vehicle 102 regardless of the current cost of electric energy. In other aspects, in the economic mode, the control unit may initiate charging the vehicle 102 regardless of the current cost of electric energy, and continues charging the vehicle 102 until the state of charge of the battery of the vehicle 102 reaches a minimum state of charge. Once the battery reaches the minimum state of charge, the control unit may postpone charging the remainder of the battery until the cost of charging the battery is reduced, such as during off-peak times. In other aspects, in the economic mode, the control unit may initiate charging the vehicle when the costs of the electric energy are reduced, e.g., during off-peak hours.

Additionally, in the green charging mode, the control unit may initiate charging the battery when the electric energy provided to the charging station is generated using a renewable energy sources, e.g., sun, wind, or tides. Furthermore, in the fast charging mode, the control unit may initiate a charging to provide a predetermined range, e.g., a number of miles/kilometers, in shortened period of time, e.g., 10-30 minutes. This mode of charging may be used, for example, at rest stops, by commuters in metropolitan areas, or while parked at a retail shopping center. The fast charging mode may also offer a restricted charge, e.g., stopping at a predetermined charge level, or may change the charging rate to a lower level after reaching the predetermined charge level. In the slow charging mode, the charging station may provide between 2 and 5 miles per hour. The slow charging mode may be used when a user travels a shorter distance each day, e.g., less than 40 miles a day, and may be able to charge the vehicle overnight.

Figure 2:
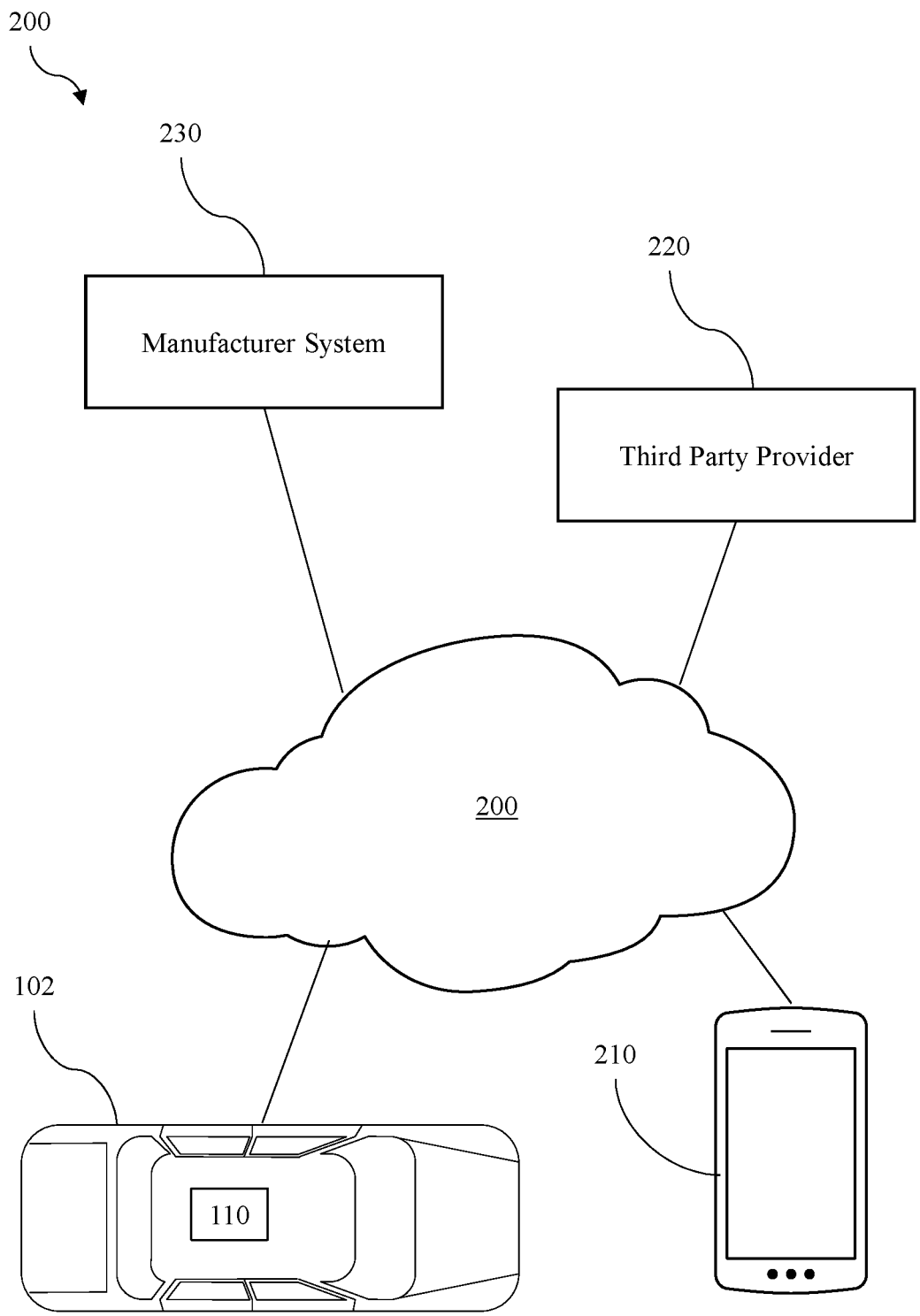
FIG. 2 illustrates an exemplary network for managing the vehicle system.

FIG. 2 illustrates an exemplary network 200 for managing the vehicle system 110. The network 200 may be a communications network that facilitates communications between multiple systems. For example, the network 200 may include the Internet or another Internet Protocol (IP) based network. The network 200 may enable the vehicle system 110 to communicate with a mobile device 210, a third party provider 220, or a manufacturer system 230. The vehicle system 110 within the vehicle 102 may communicate with the network 200 via the communications device 118. The vehicle system 110 may, for example, transmit/receive charging information to/from the manufacturer system 230.

Figure 3:
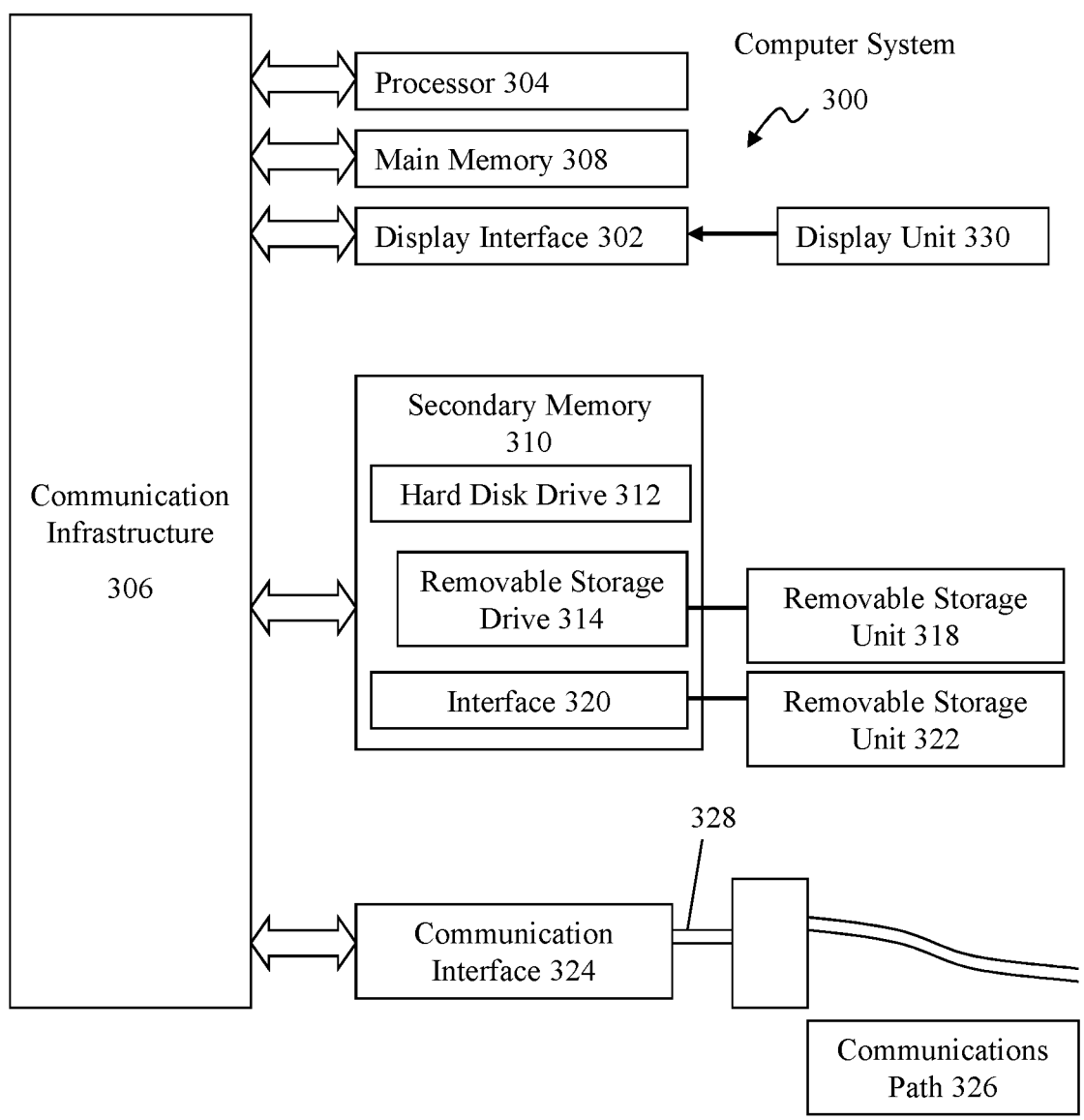
FIG. 3 illustrates various features of an exemplary computer system for use in conjunction with aspects of the present disclosure.

The manufacturer system 230 may include a computer system, as shown with respect to FIG. 3 described below, associated with one or more vehicle manufacturers or dealers. The manufacturer system 230 may include one or more databases that store data related to charging patterns of the vehicle 102. The manufacturer system 230 may also include a memory that stores instructions for executing processes for monitoring a charging pattern to identify a customer and a processor configured to execute the instructions.

In some aspects, the manufacturer system 230 may monitor real-time charging patterns of each user of a plurality of users of the vehicle 102 to determine a preferred charging mode for each user. For example, the manufacturer system 230 may determine that a first user prefers a first charging mode while charging the vehicle 102 at a first location and a second charging mode while charging the vehicle at a second location. Additionally, the manufacturer system 230 may determine that a second user may have different preferences than the first user. For example, the second user may prefer a third charging mode that is ubiquitous to all charging stations. Additionally, in some aspects, the manufacturer system 230 may associate preferred charging modes with a particular user based on the location of the charging station. For example, the manufacturer system 230 may store information related to each of the users identifying where each of the users is employed. Using this information, the manufacturer system 230 may associate the charging patterns associated with each location to the relevant user.

In other aspects, the manufacturer system 230 may also store information related to each of the users indicating preferred charging locations other than a home location or a work location. For example, the manufacturer system 230 may prompt the user, via the display, to store a charging station location when the user connects the vehicle 102 to the charging station for the first time. Additionally, the manufacturer system 230 may store preferences for this charging station, such as cost savings based on time of use rates, preferred charging mode, desired range, desired costs, etc. In this way, when the user connects to the same charging station in the future, the manufacturer system 230 already has a profile stored for the charging station.

In further aspects, the manufacturer system 230 may also store information related to a driving schedule for each of the plurality users. For example, the first user may operate the vehicle 102 on certain days of the week, while the second user may operate the vehicle 102 whenever the vehicle 102 is not in use by the first user. Additionally, the first user may operate the vehicle 102 during a set period of time during the day and the second user may operate the vehicle 102 during a different set period of time during the same day. Based on the driving schedule for the vehicle 102, the manufacturer system 230 may store a charging pattern for a given charging location based on the driver identified by the driving schedule.

In still some aspects, using the charging patterns of each of the plurality of users, the manufacturer system 230 may generate a user profile that is used to allocate resources for the vehicle 102. For example, the manufacturer system 230 may generate a user profile for each user indicating each user's preferred charging mode and other charging preferences (e.g., cost, range, time, etc.) at a given charging station and when the user may operate the vehicle. In other aspects, the manufacturer system 230 may use the user profiles to request a resource, such as electrical power, from a third party vendor that comports with the user profile without identifying the user to the third party. In response to the request for the resource, the third party vendor transmits a resource schedule based on the preferences of the user back to the manufacturer system 230. In some aspects, the manufacturer system 230 processes the resource schedule and transmits a charging schedule to the vehicle 102. Using the charging schedule, the vehicle 102 may be charged in accordance with the user preferences.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system 300 is shown in FIG. 3.

Computer system 300 includes one or more processors, such as processor 304. The processor 304 is connected to a communication infrastructure 306 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 300 may include a display interface 302 that forwards graphics, text, and other data from the communication infrastructure 306 (or from a frame buffer not shown) for display on a display unit 330. Computer system 300 also includes a main memory 308, preferably random access memory (RAM), and may also include a secondary memory 310. The secondary memory 310 may include, for example, a hard disk drive 312, and/or a removable storage drive 314, representing a floppy disk drive, a magnetic tape drive, an optical disk drive, a universal serial bus (USB) flash drive, etc. The removable storage drive 314 reads from and/or writes to a removable storage unit 318 in a well-known manner. Removable storage unit 318 represents a floppy disk, magnetic tape, optical disk, USB flash drive etc., which is read by and written to removable storage drive 314. As will be appreciated, the removable storage unit 318 includes a computer usable storage medium having stored therein computer software and/or data.

Alternative aspects of the present disclosure may include secondary memory 310 and may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328, which may be electronic, electromagnetic, optical or other signals capable of being received by communications interface 324. These signals 328 are provided to communications interface 324 via a communications path (e.g., channel) 326. This path 326 carries signals 328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 318, a hard disk installed in hard disk drive 312, and signals 328. These computer program products provide software to the computer system 300. Aspects of the present disclosure are directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features in accordance with aspects of the present disclosure, as discussed herein. In particular, the computer programs, when executed, enable the processor 304 to perform the features in accordance with aspects of the present disclosure. Accordingly, such computer programs represent controllers of the computer system 300.

In an aspect of the present disclosure where the disclosure is implemented using software, the software may be stored in a computer program product and loaded into computer system 300 using removable storage drive 314, hard drive 312, or communications interface 320. The control logic (software), when executed by the processor 304, causes the processor 304 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 4:
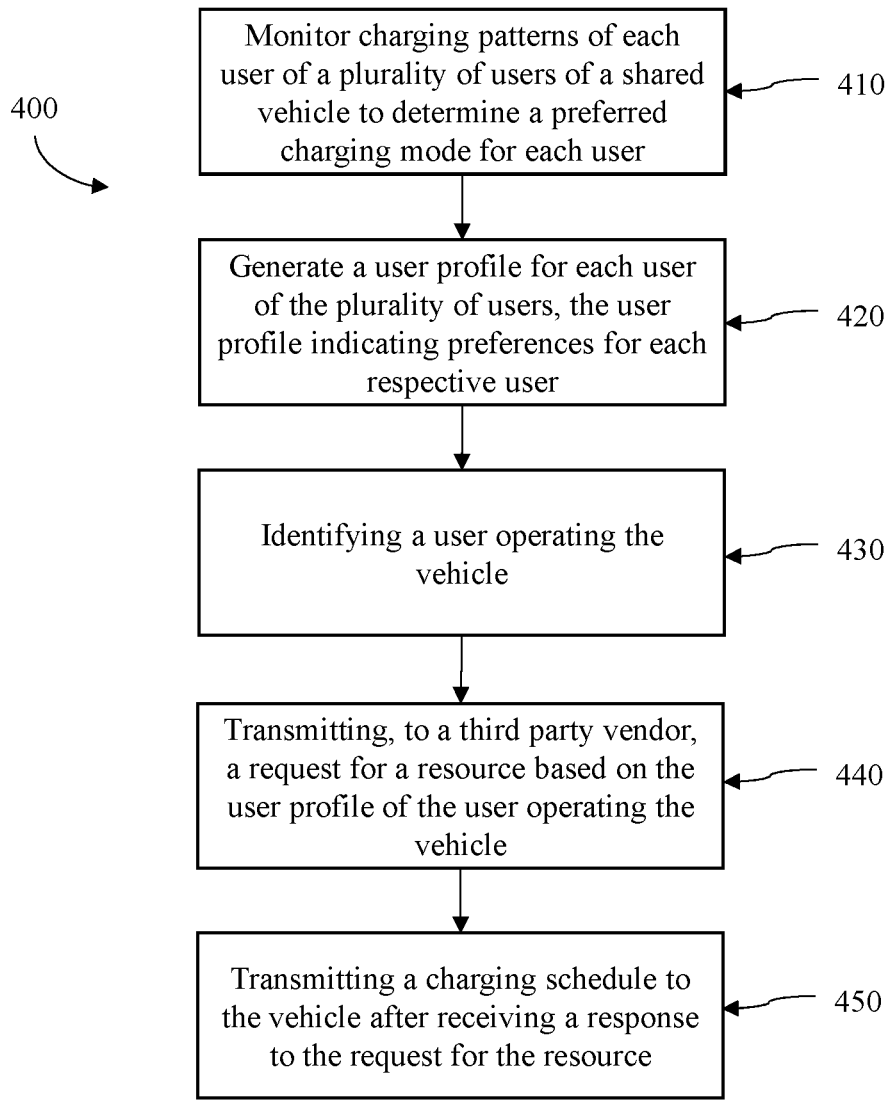
FIG. 4 illustrates a flowchart for monitoring a charging pattern to identify a customer.

FIG. 4 illustrates a flowchart for monitoring a charging pattern to identify a customer. A method 400 includes monitoring charging patterns of each user of a plurality of users of a shared vehicle to determine a preferred charging mode for each user 410. The method also includes generating a user profile for each user of the plurality of users, the user profile indicating preferences for each respective user 420. The method further includes identifying a user operating the vehicle 430 and transmitting, to a third party vendor, a request for a resource based on the user profile of the user operating the vehicle 440. The method also includes transmitting a charging schedule to the vehicle after receiving a response to the request for the resource 450.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system for charging a shared electric vehicle, comprising:
    a memory that stores instructions for executing processes for charging the shared electric vehicle based on a charging pattern for one user of a plurality of users of the shared electric vehicle; and
    a processor configured to execute the instructions, wherein the instructions cause the processor to:
        monitor charging patterns of each user of the plurality of users of the shared electric vehicle to determine a preferred charging mode for each user;
        generate a user profile for each user of the plurality of users, the user profile indicating preferences for each respective user, wherein the user profile for a respective user from among the plurality of users indicates a first preferred charging mode for a first location and a second preferred charging mode for a second location, wherein the first and the second charging modes are different;
        identify a user operating the shared electric vehicle;
        transmit, to a third party vendor, a request for a resource based on a charging mode for the user selected based on the user profile of the user operating the shared electric vehicle and a current charging location; and
        after receiving a response to the request for the resource, transmit a charging schedule to the shared electric vehicle to charge the shared electric vehicle according to the preferred charging mode.

2. The system of claim 1, wherein, for a user from among the plurality of users, the charging patterns indicate a ubiquitous preferred charging mode for each charging location associated with the user.

3. The system of claim 1, wherein the processor is configured to identify a first user from among the plurality of users when a driving schedule indicates that the first user is scheduled to operate the vehicle during a first period of time and to identify a second user from among the plurality of users when the driving schedule indicates that the second user is scheduled to operate the vehicle during a second period of time.

4. The system of claim 3, wherein the processor is configured to store a charging pattern for a given charging location based on the identified driver as indicated by the driving schedule.

5. The system of claim 1, wherein the processor is further configured to store a charging station location when a user connects the vehicle to a new charging station and to store a charging preferences for the new charging station.

6. The system of claim 1, wherein the charging mode indicates a condition for initiating the charging, one or more charging speeds, and a condition for stopping the charging based on one or more of cost of electric energy, source of electric energy, and predetermined charge level.

7. A method of charging a shared electric vehicle based on a charging pattern for one user of a plurality of users of the shared electric vehicle, comprising:

monitoring charging patterns of each user of the plurality of users of the shared vehicle to determine a preferred charging mode for each user;

generating a user profile for each user of the plurality of users, the user profile indicating preferences for each respective user, wherein the user profile for a respective user from among the plurality of users indicates a first preferred charging mode for a first location and a second preferred charging mode for a second location, wherein the first and the second charging modes are different;

identifying a user operating the shared electric vehicle;

transmitting, to a third party vendor, a request for a resource based on a charging mode for the user selected based on the user profile of the user operating the shared electric vehicle and a current charging location; and after receiving a response to the request for the resource, transmitting a charging schedule to the shared electric vehicle to charge the shared electric vehicle according to the preferred charging mode.

8. The method of claim 7, wherein, for a user from among the plurality of users, the charging patterns indicate a ubiquitous preferred charging mode for each charging location associated with the user.

9. The method of claim 7, wherein identifying the user operating the vehicle based on the user profiles comprises identifying a first user from among the plurality of users when a driving schedule indicates that the first user is scheduled to operate the vehicle during a first period of time and identifying a second user from among the plurality of users when the driving schedule indicates that the second user is scheduled to operate the vehicle during a second period of time.

10. The method of claim 9, further comprising storing a charging pattern for a given charging location based on the identified driver as indicated by the driving schedule.

11. The method of claim 7, further comprising storing a charging station location when a user connects the vehicle to a new charging station and to store a charging preferences for the new charging station.

12. The method of claim 7, wherein the charging mode indicates a condition for initiating the charging, one or more charging speeds, and a condition for stopping the charging based on one or more of cost of electric energy, source of electric energy, and predetermined charge level.

13. A non-transitory computer-readable storage medium containing executable computer program code, the code comprising instructions configured to cause a processor to:

monitor charging patterns of each user of a plurality of users of a shared electric vehicle to determine a preferred charging mode for each user;

generate a user profile for each user of the plurality of users, the user profile indicating preferences for each respective user, wherein the user profile for a respective user from among the plurality of users indicates a first preferred charging mode for a first location and a second preferred charging mode for a second location, wherein the first and the second charging modes are different;

identify a user operating the shared electric vehicle;

transmit, to a third party vendor, a request for a resource based on a charging mode for the user selected based on the user profile of the user operating the shared electric vehicle and a current charging location; and after receiving a response to the request for the resource, transmit a charging schedule to the shared electric vehicle to charge the shared electric vehicle according to the preferred charging mode.

14. The non-transitory computer-readable storage medium of claim 13, wherein, for a user from among the plurality of users, the charging patterns indicate a ubiquitous preferred charging mode for each charging location associated with the user.

15. The non-transitory computer-readable storage medium of claim 13, wherein the processor is configured to identify a first user from among the plurality of users when a driving schedule indicates that the first user is scheduled to operate the vehicle during a first period of time and to identify a second user from among the plurality of users when the driving schedule indicates that the second user is scheduled to operate the vehicle during a second period of time.

16. The non-transitory computer-readable storage medium of claim 13, wherein the processor is configured to store a charging pattern for a given charging location based on the identified driver as indicated by the driving schedule.

17. The non-transitory computer-readable storage medium of claim 13, wherein the charging mode indicates a condition for initiating the charging, one or more charging speeds, and a condition for stopping the charging based on one or more of cost of electric energy, source of electric energy, and predetermined charge level.

* * * * *